(12) United States Patent
Watari et al.

(10) Patent No.: US 7,922,902 B2
(45) Date of Patent: *Apr. 12, 2011

(54) HOLLOW FIBER MEMBRANE MODULE, HOLLOW FIBER MEMBRANE MODULE UNIT, AND WATER TREATMENT METHOD

(75) Inventors: Kenji Watari, Tokyo (JP); Satoshi Takeda, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 797 days.

This patent is subject to a terminal disclaimer.

(21) Appl. No.: 10/577,387

(22) PCT Filed: Oct. 28, 2004

(86) PCT No.: PCT/JP2004/016039
§ 371 (c)(1),
(2), (4) Date: Apr. 26, 2006

(87) PCT Pub. No.: WO2005/042133
PCT Pub. Date: May 12, 2005

(65) Prior Publication Data
US 2007/0131605 A1 Jun. 14, 2007

(30) Foreign Application Priority Data
Oct. 30, 2003 (JP) .................................. 2003-370498

(51) Int. Cl.
*B01D 63/02* (2006.01)
(52) U.S. Cl. ............ 210/257.2; 96/8; 96/9; 210/321.88; 210/321.89; 210/500.23
(58) Field of Classification Search ............. 210/321.79, 210/321.8, 321.89, 321.9, 321.69, 321.84, 210/321.75, 500.23, 636, 650, 321.88, 257.2; 96/4, 7–10
See application file for complete search history.

(56) References Cited

U.S. PATENT DOCUMENTS
3,228,876 A * 1/1966 Mahon .......................... 210/638
(Continued)

FOREIGN PATENT DOCUMENTS
CN 2369748 Y 3/2000
(Continued)

OTHER PUBLICATIONS
Notice of Allowance, dated Jan. 5, 2010, in JP appln. 2004-539556.
(Continued)

*Primary Examiner* — Tony G Soohoo
*Assistant Examiner* — David C Mellon
(74) *Attorney, Agent, or Firm* — Fitch, Even, Tabin & Flannery

(57) ABSTRACT

A hollow fiber membrane module, a hollow fiber membrane module unit using the hollow fiber membrane module, and a water treatment method using the module or the module unit enable the efficient contact of microorganisms on the surface of a membrane with a gas, the module and the unit having excellent durability. The hollow fiber membrane module is formed in such a manner that the end parts of sheet-form hollow fiber membranes are formed in a substantially rectangular shape and the end face of the anchoring member on a side where the hollow fiber membranes open is formed in a substantially circular shape. The hollow fiber membrane module unit is formed in such a manner that a plurality of modules is disposed. The water treatment method is used to purify treated water with the microorganisms adhered onto the outer surfaces of the hollow fiber membranes by using the module or the unit.

6 Claims, 5 Drawing Sheets

U.S. PATENT DOCUMENTS

| | | | | |
|---|---|---|---|---|
| 3,702,658 | A | * | 11/1972 | McNamara et al. ........ 210/321.8 |
| 4,451,369 | A | * | 5/1984 | Sekino et al. ............... 210/321.9 |
| 4,806,246 | A | * | 2/1989 | Nomura ......................... 210/651 |
| 5,026,479 | A | * | 6/1991 | Bikson et al. .............. 210/321.8 |
| 5,472,613 | A | * | 12/1995 | Schofield ...................... 210/634 |
| 5,639,373 | A | * | 6/1997 | Mahendran et al. .......... 210/636 |
| 5,783,083 | A | * | 7/1998 | Henshaw et al. ............. 210/636 |
| 5,922,201 | A | * | 7/1999 | Yamamori et al. ....... 210/321.79 |
| 6,156,200 | A | * | 12/2000 | Zha et al. ................. 210/321.89 |
| 6,319,411 | B1 | * | 11/2001 | Cote ............................. 210/636 |
| 6,511,602 | B1 | * | 1/2003 | Miyashita et al. ............ 210/636 |
| 6,645,381 | B2 | * | 11/2003 | McEvoy ................... 210/321.78 |
| 7,294,267 | B2 | * | 11/2007 | Takeda et al. ............ 210/321.89 |
| 7,491,329 | B2 | * | 2/2009 | Takeda et al. .............. 210/257.2 |
| 2001/0037967 | A1 | * | 11/2001 | Rabie et al. ................ 210/321.8 |
| 2002/0148775 | A1 | * | 10/2002 | Watari et al. ............. 210/500.23 |
| 2003/0111414 | A1 | * | 6/2003 | Baurmeister et al. ......... 210/641 |
| 2004/0238975 | A1 | | 12/2004 | Sakakibara et al. |

FOREIGN PATENT DOCUMENTS

| | | |
|---|---|---|
| CN | 2455348 Y | 10/2001 |
| EP | 1421988 A1 | 5/2004 |
| JP | 01-266258 A | 10/1989 |
| JP | 03-119159 A | 5/1991 |
| JP | A-03-242230 | 10/1991 |
| JP | H03-242240 A | 10/1991 |
| JP | B-04-026886 | 1/1992 |
| JP | H04-028668 A | 1/1992 |
| JP | 05-37328 U | 5/1993 |
| JP | 05-37328 U | 5/1993 |
| JP | H05-37328 U | 5/1993 |
| JP | 05-261254 A | 10/1993 |
| JP | 05-261254 A | 10/1993 |
| JP | 06-099038 A | 4/1994 |
| JP | 06-099038 A | 4/1994 |
| JP | H06-099038 A | 4/1994 |
| JP | 07-178320 A | 7/1995 |
| JP | 07-178320 A | 7/1995 |
| JP | H07-178320 A | 7/1995 |
| JP | 07-232040 A | 9/1995 |
| JP | 07-232040 A | 9/1995 |
| JP | A-07-275667 | 10/1995 |
| JP | H07-275667 A | 10/1995 |
| JP | 10-057782 A | 3/1998 |
| JP | 10-085787 A | 4/1998 |
| JP | 11-123319 A | 5/1999 |
| JP | 11-123319 A | 5/1999 |
| JP | 2000-051670 A | 2/2000 |
| JP | 2000-051670 A | 2/2000 |
| JP | 2000-051670 A | 2/2000 |
| JP | 2000-218290 A | 8/2000 |
| JP | 2001-205054 | 7/2001 |
| JP | A-2001-205054 | 7/2001 |
| JP | 2002-035553 A | 2/2002 |
| JP | 2002-035553 A | 2/2002 |
| JP | 2002-370006 A | 12/2002 |
| JP | 2003-033776 A | 2/2003 |
| WO | WO 03/020405 A1 | 3/2003 |
| WO | WO 2004/028672 A1 | 4/2004 |

OTHER PUBLICATIONS

Chinese Office action dated Jul. 7, 2006 in Chinese Appln. 038227045.

* cited by examiner

HOLLOW FIBER MEMBRANE MODULE, HOLLOW FIBER MEMBRANE MODULE UNIT, AND WATER TREATMENT METHOD

This Application is the National Phase of International Application No. PCT/JP2004/016039 filed Oct. 28, 2004, which designated the U.S. and was not published under PCT Article 21(2) in English, and this application claims, via the aforesaid International Application, the foreign priority benefit of and claims the priority from Japanese Application No. 2003-370498, filed Oct. 30, 2003, the complete disclosures of which are incorporated herein by reference.

TECHNICAL FIELD

The present invention relates to a hollow fiber membrane module, a hollow fiber membrane module unit, and a water treatment method used mainly for the treatment of portable water and waste water.

BACKGROUND ART

In typical biological water treatment methods such as an activated sludge treatment method, aerobic microorganisms and denitrifying bacteria for eliminating nitrate nitrogen are often used.

When aerobic microorganisms are used, the inside of a treatment tank needs to be aerated with air or oxygen in order to maintain activity and improve treatment capacity of these microorganisms. In order to provide a constant treatment process when there is a variation in inflow load, various treatment methods using immobilized microorganisms for maintaining a high concentration of microorganisms in the treatment tank are used. Typical examples are a method of attaching microorganisms to the surface of a carrier material such as polyurethane, or a method of immobilization by entrapment of microorganisms within a carrier in which microorganisms are immobilized with polyvinyl alcohol and the like within a carrier.

Furthermore, when the denitrifying bacteria are used, a system of immobilizing a cell body by entrapment within polymer gel beads, and supplying a gas to be used for a reaction (a fluidized bioreactor) has been proposed.

As a typical example of carriers for immobilizing microorganisms, a hollow fiber membrane is proposed. If microorganisms are attached or immobilized to the surface of the hollow fiber membrane, the surface area of the membrane to be stored per unit volume can be enlarged. Accordingly, the concentration of microorganisms in the treatment tank is increased and also oxygen and the like which are necessary for treatment can be efficiently supplied, so that treatment efficiency can be improved.

As methods using a hollow fiber membrane, a method of nitrifying and denitrifying by propagating aerobic nitrifying bacteria to the surface of a hollow fiber membrane (for example, see patent references 1 and 2), or a method of immobilizing autotrophic bacteria which are able to reduce nitrate nitrogen to nitrogen gas within the hollow fiber to become a bioreactor element (for example, see patent reference 3) are disclosed.

To treat the large amount of water to be treated by a bioreactor, a membrane having a large area is necessary and also water to be treated needs to make contact with microorganisms on the surface of membrane. Using a conventional module or bioreactor, there is a concern that treatment efficiency decreases if the amount of water to be treated exceeds an L/hr level. Furthermore, since installation space is limited, a compact sized module or bioreactor with a membrane having a large area is required.

Furthermore, if microorganisms attached on the surface of the hollow fiber membrane excessively propagate as the operation of a module or bioreactor continues, the microorganisms form some clumps between membranes; therefore, contact efficiency of clumps of microorganisms with water to be treated or gas supplied from the membrane decreases. This phenomenon remarkably appears as the membrane area is made larger and the number of hollow fiber membrane increases.

To prevent such a phenomenon, excess microorganisms or the like can be washed out from the surface of the membrane by means of air bubbling from the bottom of a module and the like. However, it is required that air bubbling be uniformly applied to the entire module; therefore, there is a problem in that uniformity in applying air bubbling decreases as the membrane area of the module increases.

Furthermore, as the membrane area increases, the large number of the hollow fiber membranes must be anchored with anchoring members. In this case, since the cross-sectional area which is perpendicular to the longitudinal direction of fibers provided in an anchored portion is enlarged, withstand pressure of the module against gas pressure to be supplied into the inside of the hollow fiber membrane decreases.

Patent reference 1: Japanese Unexamined Patent Application, First Publication No. H 10-85787

Patent reference 2: Japanese Unexamined Patent Application, First Publication No. 2000-218290

Patent reference 3: Japanese Unexamined Patent Application, First Publication No. 2003-33776

DISCLOSURE OF INVENTION

Problems to be Solved by the Invention

An object of the present invention is the provision of a hollow fiber membrane module and a hollow fiber membrane module unit, and a water treatment method using them, in which microorganisms on the surface of the hollow fiber membrane are efficiently contacted with water to be treated and a gas supplied from the membrane surface, bubbling washing for removing excess microorganisms is carried out uniformly and efficiently, and a high withstand pressure against gas pressure to be supplied is exhibited. The present invention is suited to a hollow fiber membrane module, a hollow fiber membrane module unit, and a water treatment method using them for the treatment of a large amount of water to be treated.

Means for Solving the Problem

A first aspect of the present invention is a hollow fiber membrane module comprising: a sheet-form hollow fiber membrane (1) including a hollow fiber membrane having a non-porous layer; and an anchoring member (2), wherein an end of a side of a hollow fiber membrane opening of the sheet-form hollow fiber membrane (1) is fastened by the anchoring member (2) so that a plurality of sheet-form hollow fiber membranes (1) are substantially parallel to each other while leaving the end open, an end face of the anchoring member (2) on a side where the hollow fiber membranes are exposed is substantially rectangular, and an end face of the anchoring member (2) on a side where the hollow fiber membranes open is substantially circular.

A second aspect of the present invention is a hollow fiber membrane module unit comprising a plurality of the above-described hollow fiber membrane modules provided therein, wherein a plate member (5) having a hole through which at least a part of an anchoring member (2) passes is provided on a side surface of the hollow fiber membrane modules perpendicular to sheet surfaces of sheet-form hollow fiber membranes (1), and the plate member (5) is fastened between the anchoring member (2) and a water collecting cap (6).

A third aspect of the present invention is a water treatment method comprising the steps of: attaching microorganisms to exterior surfaces of sheet-form hollow fiber membranes (1); supplying water to be treated to the exterior surfaces; and purifying the water to be treated by supplying a gas into hollow portions of the sheet-form follow fiber membranes (1), in which a hollow fiber membrane module comprises: the sheet-form hollow fiber membrane (1) including a hollow fiber membrane having a non-porous layer; and an anchoring member (2), wherein an end of a side of a hollow fiber membrane opening of the sheet-form hollow fiber membrane (1) is fastened by the anchoring member (2) so that a plurality of the sheet-form hollow fiber membranes (1) are substantially parallel to each other while leaving the end open, an end face of the anchoring member (2) on a side where the hollow fiber membranes are exposed is substantially rectangular, and an end face of the anchoring member (2) on a side where the hollow fiber membranes open is substantially circular, or a hollow fiber membrane module unit in which a plurality of the hollow fiber membrane modules are provided is used.

EFFECTS OF THE INVENTION

In the hollow fiber membrane module according to the present invention, since an end face of the anchoring member (2) on a side where the hollow fiber membranes are exposed is substantially rectangular, and an end face of the anchoring member (2) on a side where the hollow fiber membranes open is substantially circular, withstand pressure of the hollow fiber membrane anchoring part does not decrease even when the membrane area is increased in the module that employs the sheet-form hollow fiber membranes (1) which can be cleaned efficiently.

In the hollow fiber membrane module unit according to the present invention, since the plate member (5) having the hole through which at least a part of the anchoring member (2) passes is provided, the hollow fiber membrane modules are secured in place by the plate member (5), and the plate member (5) is provided between the anchoring member (2) and the water collecting cap (6), anchoring the hollow fiber membrane modules is achieved easily and reliably, and a high density of the hollow fiber membranes (1) can be achieved.

In the water treatment method according to the present invention, since microorganisms are attached to exterior surfaces of the sheet-form hollow fiber membranes; water to be treated is supplied to the exterior surfaces; and the water to be treated is purified by supplying a gas into hollow portions of the membranes, using the above-described hollow fiber membrane module or the hollow fiber membrane module unit, microorganisms on the surface of membrane can be efficiently contacted with the water to be treated and the gas supplied from the membrane faces and bubbling washing for removing excess microorganisms can be carried out uniformly and efficiently.

BEST MODE FOR CARRYING OUT THE INVENTION

The present invention will now be described in detail with reference to the accompanying drawings.

FIG. 1 is a perspective view of an example of a hollow fiber membrane module of the present invention. The hollow fiber membrane module (A) is substantially constituted from sheet-form hollow fiber membranes (1) including a hollow fiber membrane having a non-porous layer, anchoring members (2), and caps (6). A plurality of the sheet-form hollow fiber membranes (1) are disposed in parallel to each other at equal intervals with both ends thereof being left open and secured by the anchoring members (2), while the caps (6) are mounted on the anchoring members (2).

In the sheet-form hollow fiber membranes (1) used in the present invention, a plurality of hollow fiber membranes are arranged in sheet form, for example, the hollow fiber membranes are formed in parallel with optional means such as knitting or weaving. Specific methods are disclosed in Japanese Examined Patent Application, Second Publication No. 4-26886, Japanese Unexamined Patent Application, First Publication No. 1-266258, Japanese Unexamined Patent Application, First Publication No. 3-119159, Japanese Unexamined Patent Application, First Publication No. 10-57782, and the like; however, methods are not limited by these.

Furthermore, the sheet-form hollow fiber membrane (1) which constitutes the hollow fiber membrane module of the present invention includes a hollow fiber membrane having a non-porous layer. As a hollow fiber membrane, a membrane composed of only a non-porous layer can be used; however, a certain thickness of the membrane is required to maintain mechanical strength of the membrane itself. If the thickness of the membrane is thick, gas permeability becomes too low; therefore, the amount of gas required for treatment cannot be supplied and thus there is a possibility that the thick membrane is difficult to apply to the water treatment method of the present invention. As a hollow fiber membrane having a non-porous layer, a three-layer composite hollow fiber membrane containing a three-layer structure in which porous layers are provided at both faces of the non-porous layer is preferably used.

In such hollow fiber membranes, the non-porous layer disposed between porous layers in the three-layer structure needs to include a gas-permeable material. Though the non-porous layer has gas permeability, the resistance of gas permeation of the non-porous layer is higher than that of the porous layer. Therefore, the amount of gas supply required for treatment is easily controlled and treatment efficiency related to the amount of gas supply is increased.

Regarding the three-layer composite hollow fiber membrane, when a three-layer composite hollow fiber membrane having a 0.3 to 3 μm-thick non-porous layer and 5 to 100 μm-thick porous layers in view of gas permeability is used, high mechanical strength and a satisfactory amount of gas permeation for biological treatment are obtained.

Furthermore, the membrane thickness of the three-layer composite hollow fiber membrane is preferably 0.1 or more of the ratio of a membrane thickness to an inner diameter (membrane thickness/inner diameter). When the ratio of membrane thickness is 0.1 or more, strength of the membrane is improved and the membrane tends not to burst due to the supply gas. The upper limit of the ratio of membrane is not especially limited, but preferably, a ratio of 0.6 or less tends to adjust the balance of strength of the membrane and gas permeability.

The inner diameter of the three-layer composite hollow fiber membrane is not especially limited. The outer diameter of the three-layer composite hollow fiber membrane is preferably within 100 to 3000 μm. When the outer diameter is 100 μm or more, hollow fiber membranes tend not to tangle with each other in the sheet-form hollow fiber membrane or between the sheet-form hollow fiber membranes. Especially, when applying the water treatment method of the present invention, it becomes difficult to tangle hollow fiber membranes with each other. Then, raw water supplied to the outside of the hollow fiber membranes is more uniformly contacted with microorganisms on the membrane surfaces, and water treatment efficiency tends to be improved. Furthermore, when the outer diameter is 3000 µm or less, a module having high packing efficiency of the membranes and superior water treatment efficiency tends to be obtained.

In addition, the pore diameter of the porous layer of the three-layer composite hollow fiber membrane is preferably within 0.005 to 1 µm. When the pore diameter is 0.005 µm or more, gas permeate resistance decreases and then a sufficient amount of gas is able to be supplied to microorganisms on the membrane surfaces, and therefore, superior water treatment efficiency tends to be obtained. More preferably, the pore diameter is 0.01 µm or more. When the pore diameter is 1 µm or less, it is difficult for the non-porous layer to become wet by a liquid; therefore, deterioration of the non-porous layer tends to decrease. More preferably, the pore diameter is 0.8 µm or less.

Typical polymers including the non-porous layer of the three-layer composite hollow fiber membrane include polydimethylsiloxane; silicon rubber-based polymer such as a copolymer of silicon and polycarbonate; polyolefin-based polymer such as poly(4-methylpentene-1) and low density polyethylene; fluorine-containing polymer such as perfluoroalkyl-based polymer; cellulose-based polymer such as ethylcellulose; polyphenyleneoxide; poly(4-vinylpyridine); and urethane-based polymer. A copolymer or blend polymer of these polymer materials can be used.

Typical polymer materials including the porous layer of the three-layer composite hollow fiber membrane include polyolefin-based polymer such as polyethylene, polypropylene, poly(3-methylbutene-1), and poly(4-methylpenetene-1); fluorine-based polymer such as polyfluorovinylidene and polytetrafluoroethylene; and polymer such as polystyrene, polyetheretherketone, and polyetherketone.

For example, when a hollow fiber membrane textile is knitted before the hollow fiber membranes are made into a sheet, it is required that the hollow fiber membranes be easily processed. Therefore, materials having high strength and elongation such as polyethylene and polypropylene are preferably used in the porous layer.

A combination of polymer materials including the non-porous layer and polymer materials including the porous layer is not especially limited; a combination of the same kinds of polymers may be used as well as a combination of different kinds of polymers.

The gas permeability of the hollow fiber membrane comprising a non-porous layer of the present invention is preferably within 0.01 to 50 m$^3$/m$^2$·MPa. When the gas permeability of the hollow fiber membrane is 0.01 m$^3$/m$^2$·MPa or more, a sufficient amount of gas is supplied to microorganisms on the membrane surfaces and water treatment efficiency tends to be improved. 0.05 m$^3$/m$^2$·MPa or more is more preferable. When the gas permeability of the hollow fiber membranes is 50 m$^3$/m$^2$·MPa or less, gas not used for water treatment is decreased and efficiency of utilizing the gas is improved, and further it tends to be able to prevent microorganisms attached to the membrane surfaces from falling off more than need be by generation of excess bubbles. 5 m$^3$/m$^2$·MPa or less is more preferable.

FIG. 2 shows an example of the hollow fiber membrane anchoring section of the hollow fiber membrane module of the present invention, in a sectional view perpendicular to the direction of the sheet surface of the sheet-form hollow fiber membrane. A plurality of the sheet-form hollow fiber membranes (1) are disposed in substantially parallel to each other at equal intervals with the end thereof being secured by the anchoring member (2).

The end face of the anchoring member (2) on the side where the sheet-form hollow fiber membrane (1) is exposed is substantially rectangular, and the end face of the anchoring member (2) on the side where the hollow fiber membrane opens is substantially circular. When the end face of the anchoring member (2) on the side where the hollow fiber membrane opens is cylindrical, far higher withstand pressure can be achieved since deflection is smaller than in the case of a rectangular parallelepiped shape and stress is distributed. Thus, all of the withstand pressure, efficiency of cleaning, and density of hollow fiber membranes can be improved with this configuration, even when a large number of sheet-form hollow fiber membranes (1) are disposed.

The side of the anchoring member (2) where the sheet-form hollow fiber membrane (1) is exposed means a side where the sheet-form hollow fiber membrane (1) extrudes from the anchoring member (2) as an effective membrane face to which microorganisms are attachable on the surface of the sheet-form hollow fiber membrane (1). The side of the anchoring member (2) where the hollow fiber membrane opens means a side where the hollow portion of the hollow fiber membrane opens in the anchoring member (2).

The anchoring member (2) may be formed in such a shape that changes continuously from the side where the sheet-form hollow fiber membrane (1) is exposed toward the opening end. Furthermore, the following three superior effects can be achieved at the same time by forming the anchoring member (2) in a constitution that has a rectangular parallelepiped section (3) of a substantially rectangular parallelepiped shape on the side where the hollow fiber membrane is exposed, and a cylindrical section (4) of a substantially cylindrical shape on the side where the hollow fiber membrane opens, as shown in FIG. 1 and FIG. 2.

1. A large number of sheet-form hollow fiber membranes (1) can be anchored while maintaining spaces between each other on the rectangular parallelepiped section (3) of one anchoring member (2), and therefore, efficient cleaning is ensured.

2. Very high density of the hollow fiber membranes can be achieved by disposing a plurality of the hollow fiber membrane modules (A) in such an arrangement that the side faces of adjacent rectangular parallelepiped sections (3) are in contact with each other, thereby eliminating unnecessary space.

3. A step between the rectangular parallelepiped section (3) and the cylindrical section is formed, and therefore, an adhesive area of the anchoring member and the inside of a housing (10) shown in FIG. 4 can be increased and very high withstand pressure can be achieved.

The cylindrical section (4) of the anchoring member (2) may not necessarily have a perfectly circular cross section perpendicular to the central axis of the cylinder, and may be oval, modified oval, polygonal that approximates a circle such as a dodecagon or hexadecagon, while a circular cross section is most preferable.

It is preferable that the relationship $0.2 \leq L/D \leq 1$ be satisfied, where D (mm) is a diameter of the cylindrical section (4) and L (mm) is a length of the cylindrical section in the axial direction thereof.

Withstand pressure of the hollow fiber membrane anchoring section is heavily dependent on the value of L/D of the cylindrical section (4). A value of L/D less than 0.2 leads to insufficient withstand pressure, and therefore, the lower limit of L/D is preferably 0.2 or larger, and more preferably 0.25 or larger. A value of L/D larger than 1 leads to an increase in loss in an effective section of the hollow fiber membrane, and therefore, an upper limit of L/D is preferably 1 or less, and more preferably 0.8 or less.

When the cross section of the cylindrical section (4) is not a true circle, the diameter D of the cylindrical section (4) refers to the largest size across the cross section.

While sizes L and D of the cylindrical section (4) may be set in accordance with the size of the hollow fiber membrane module, it becomes difficult to install the sheet-form hollow fiber membranes (1) when D is too small. Thus, a lower limit of D is preferably 30 mm or larger, and more preferably 50 mm or larger. When D is too large, it is difficult to process the module and withstand pressure may become insufficient. Thus, an upper limit of D is preferably 400 mm or less, and more preferably 300 mm or less.

When L is too small, a withstand pressure becomes insufficient, and therefore a lower limit of L is preferably 10 mm or larger, and more preferably 50 mm or larger. When L is too large, a loss in an effective section of the hollow fiber membrane increases and resistance to passing water increases. Therefore, an upper limit of L is preferably 300 mm or less, and more preferably 200 mm or less.

FIG. 3 is a perspective view of an example of the hollow fiber membrane anchoring section for the hollow fiber membrane module of the present invention. The hollow fiber membrane module (A) of the present invention satisfies the relationship $1 \leq W/D \leq 2$, where W (mm) is a length of the longer side of the end face where the hollow fiber membrane is exposed to the rectangular parallelepiped section (3) and D (mm) is a diameter of the cylindrical section (4).

Increasing the value of W relative to D enables the membrane area of the hollow fiber membrane module to be increased without decreasing the withstand pressure of the hollow fiber membrane anchoring section. When the value of W/D is too large, however, the sheet-form hollow fiber membranes (1) are drawn too tightly, thus making it difficult to arrange the sheet-form hollow fiber membranes. This results in a problem in that the effective length of the hollow fiber membrane varies among the sheet-form hollow fiber membranes (1). Therefore, an upper limit of W/D is preferably 2 or less, and more preferably 1.8 or less.

When the value of W/D is too small, the withstand pressure decreases, although it becomes easier to process. Therefore, a lower limit of W/D is preferably 1 or larger, and more preferably 1.2 or larger.

While the value of W may be set in accordance with the membrane area of the hollow fiber membrane module, it becomes difficult to ensure a sufficiently large membrane area of the module when W is too small. Therefore, a lower limit of W is preferably 40 mm or larger, and more preferably 80 mm or larger.

When the value W is too large, it becomes difficult to process the module. Therefore, an upper limit of W is preferably 500 mm or less, and more preferably 400 mm or less.

In FIG. 3, the size W is shown as the height when the rectangular parallelepiped section (3) is larger in height than in width. When width (dimension in the direction where the sheet-form hollow fiber membranes (1) are stacked) is larger than height, W represents the width.

The length of the rectangular parallelepiped section (3) in the axial direction of the fiber of the hollow fiber membrane may be set appropriately since the configuration of arrangement of the hollow fiber membranes varies depending on the effective length and outer diameter of the hollow fiber membrane, width of the sheet-form hollow fiber membrane (1) and other factors. When the length of the rectangular parallelepiped section (3) in the axial direction of the fiber of the hollow fiber membrane is too small; however, it becomes difficult to converge the plurality of sheet-form hollow fiber membranes (1) having rectangular parallelepiped shapes that are disposed at equal intervals into a cylindrical shape. Therefore, a lower limit for the length of the rectangular parallelepiped section (3) in the axial direction of fiber of the hollow fiber membrane is preferably 5 mm or larger, and more preferably 10 mm or larger.

When the length of the rectangular parallelepiped section (3) in the axial direction of the fiber of the hollow fiber membrane is too large, a loss in the effective section of the hollow fiber membrane increases and portions that do not contribute to the filtration increase resulting in increasing resistance against passing water. Therefore, an upper limit for the length of the rectangular parallelepiped section (3) in the axial direction of the fiber of the hollow fiber membrane is 100 mm or less, preferably 70 mm or less and more preferably 50 mm or less.

The hollow fiber membrane module (A) of the present invention comprises a plurality of the sheet-form hollow fiber membranes (1) disposed in substantially parallel to each other at equal intervals. While there is no restriction on the method of arranging the hollow fiber membranes in the sheet configuration, a hollow fiber membrane sheet woven into a sheet configuration is preferably used. Spacing between the sheet-form hollow fiber membranes may be set in a range of, for example, from 2 to 100 mm, depending on the properties of the water to be treated. The number of sheet-form hollow fiber membranes may also be set in accordance with the membrane area of the module.

In order to supply a gas which is necessary for treatment into each hollow fiber membrane, the cap (6) is provided on the cylindrical section (4). This cap (6) leads to a gas pipe. The cap (6) is preferably installed by meshing threads (8) formed on the circumference of the cylindrical section (4) and threads (8) formed in the water collecting cap (6) with each other while sealing by means of a sealing member (9) such as an O-ring, as this allows easy dismantling and reliable sealing.

In the hollow fiber membrane module according to the present invention, the length in the longitudinal direction of the hollow fiber membrane may be set in accordance with a combination of the length of the sheet-form hollow fiber membrane (1) and the size of the anchoring member (2). The length in the longitudinal direction of the hollow fiber membrane is preferably 300 to 3000 mm. When the length is 300 mm or larger, the packing amount of the hollow fiber membrane per module volume tends to be ensured sufficiently. When the length is 3000 mm or less, conveyance or attaching operation of modules tends to be easy.

Furthermore, in the hollow fiber membrane module according to the present invention, the dimensions of the hollow fiber membrane which is not in the longitudinal direction is preferably set in accordance with the length of the longer side of the end face where the hollow fiber membrane is exposed to the rectangular parallelepiped section (3) of the anchoring member (2), and more preferably 40 to 500 mm.

FIG. 4 shows another example of the hollow fiber membrane anchoring member of the hollow fiber membrane module of the present invention, in a sectional view along a direction perpendicular to a sheet surface of the sheet-form hollow fiber membrane (1).

In this example, the sheet-form hollow fiber membrane (1) is fastened by the anchoring member (2) in a housing (10).

When the housing (10) is provided as in the example shown in FIG. 4, too, dimensions (D), (L), and (W) are determined with reference to the size of the anchoring member (2), similarly to the case without the housing (10).

When the housing (10) is provided, too, the cap (6) may be installed by meshing the threads (8) formed on the circumference of the cylindrical section (4) and the threads (8) formed in the cap (6) with each other while sealing by means of the sealing member (9) such as an O-ring. The cap (6) may also be integrated with the housing (10). Alternatively, the cap (6) may be bonded onto the anchoring member (2).

FIG. 5 is a perspective view showing another example of the hollow fiber membrane module of the present invention. The hollow fiber membrane module (A) of this example roughly comprises the sheet-form hollow fiber membranes (1), the anchoring member (2), the cap (6), and a supporting member (11). The sheet-form hollow fiber membranes (1) are disposed in parallel at equal spacing from each other on the anchoring member (2), and are secured by the anchoring member (2) at one end thereof and are supported by the supporting member (11) at the other end. The cap (6) is mounted on the anchoring member (2).

There are no restrictions on the structure and other features of the supporting member (11), as long as it can support the sheet-form hollow fiber membranes (1) in substantially parallel at equal spacing from each other. For example, the entire structure may be consolidated by applying a resin, or the hollow fiber membranes may be secured by means of a member that has a rod-like or thread-like shape. Furthermore, the hollow fiber membranes may be bent at the center in a U-shape, and secured at the bend by the supporting member (11).

When a large quantity of water is to be treated, it is preferable to assemble a plurality of hollow fiber membrane modules into a hollow fiber membrane module unit which is easier to handle. In this case, it is preferable to construct the hollow fiber membrane module unit with the density of the hollow fiber membranes as high as possible without compromising the ease of cleaning.

FIG. 6 is a perspective view showing an example of the hollow fiber membrane module unit of the present invention. A hollow fiber membrane module unit (B) roughly comprises hollow fiber membrane modules (A), plate members (5), the caps (6) and a side plate (12).

The plate member (5) has four holes formed therein. With the cylindrical section (4) inserted into this hole so that the sheet surface of the hollow fiber membrane module (A) is disposed in the vertical direction and the axial direction of the fiber of the hollow fiber membranes agrees with the horizontal direction, while the cap (6) is attached to the protruding cylindrical section (4), the hollow fiber membrane module (A) can be fastened by the plate member (5).

In the hollow fiber membrane module unit (B) according to the present invention, the rectangular parallelepiped section (3) of the anchoring member (2) of each module is combined to form a tetragon and the size of the plate member (5) is preferably set to substantially the same size as the tetragon.

A hole formed in the plate member (5) may have a size so that the cylindrical section (4) of the anchoring member (2) of each module is naturally inserted into the hole, the hole preferably having a diameter of 3 to 15 mm larger than the maximum diameter of the cylindrical section (4).

The cap (6) can be attached easily and reliably by means of screw engagement between the threads (8) formed on the cylindrical section (4) and on the cap (6), as described previously. In this case, as shown in FIG. 7, the cap (6) and the plate member (5) can be used to position and fasten the hollow fiber membrane module (A) in place by making the cap (6) larger than the hole formed in the plate member (5).

Four hollow fiber membrane modules (A) are fastened onto the plate member (5), and the side plates (12) are attached on both sides of the sheet-form hollow fiber membrane (1) along the sheet surface, thereby assembling the hollow fiber membrane module unit (B).

While the hollow fiber membrane module unit (B) of the example shown in FIG. 6 consists of four hollow fiber membrane modules (A), the number may be adjusted as required.

In the hollow fiber membrane module unit according to the present invention, the length in the longitudinal direction of the hollow fiber membrane may be set by corresponding to the length in the longitudinal direction of the hollow fiber membrane in the hollow fiber membrane module according to the present invention, and is preferably 300 to 3000 mm.

When one module is provided in the horizontal direction, a size of the hollow fiber membrane which is not in the longitudinal direction in the hollow fiber membrane module unit according to the present invention is preferably determined in accordance with the size of the anchoring member (2). When plural modules are provided in parallel and in the horizontal direction, it is preferred in view of handling property of the unit that the length in the horizontal direction of the plural modules is 2000 mm or less. When plural modules are provided by stacking upward, it is preferred in view of handling property of the unit that the height of the plural modules stacked is 1500 mm or lower.

The side plate (12) has a function of maintaining the shape of the hollow fiber membrane module unit (B) and a function of concentrating the hollow fiber membranes without allowing scrubbing air to leak to the outside.

Specific examples of the side plate (12) include plates comprising stainless steel, synthetic resin, FRP, and the like which have sufficient rigidity and strength. It is preferred that the opposite two- or four-way ends of the plate are bent, and thereby strength of the plate is maintained even if the plate is thinned or lightened. Furthermore, the ends are bent so that the bending angle is substantially a right angle, thereby the ends face each other when plural hollow fiber membrane module units (B) packed in the vertical direction are used as described below. Therefore, the units are easily fastened to each other, for example, the units are fastened with a bolt after making holes.

Furthermore, the side plate (12) may be a plate which is a frame made of stainless steel or the like adhered with plates made of resin or light alloy. It is more preferable to use transparent plates made of synthetic resin, glass, or the like independently or by adhering to the frame, so that the hollow fiber membrane modules can be seen from the outside, thus making it possible to check if the modules are kept clean.

The length in the longitudinal direction of the hollow fiber membrane of the side plate (12) may be a length so that the side plate (12) is provided between the plate members (5) and connects them, in which the plate members (5) are provided at both sides of the hollow fiber membrane module unit (B) according to the present invention and compose the unit. The length in the vertical direction of the hollow fiber membrane of the side plate (12) may be a length between the upper end of the rectangular parallelepiped section (3) of the module placed at the upper side and the bottom end of the rectangular parallelepiped section (3) of the module placed at the bottom. Using the side plate (12) having the above-described size enables scrubbing air to be supplied efficiently to the hollow fiber membranes without allowing the scrubbing air to leak to the outside.

The shape of the hollow fiber module unit (B) can be maintained using only a flame or a stick member replacing the side plate (12).

Furthermore, if all members of the hollow fiber membrane module (A), the plate member (5), the cap (6), and the side plate (12) are made of synthetic resin, there is no concern about each member becoming corroded when these are washed with acid.

The hollow fiber membrane modules (A) are assembled into a unit without clearance from each other so as to make contact with each other on the rectangular parallelepiped sections (3) of the anchoring member (2), thus making it possible to supply bubbling air uniformly throughout the unit.

The hollow fiber membrane module units (B) assembled as described above can be arranged as a plurality in the vertical direction or horizontal direction and integrated, so that the area of the hollow fiber membranes can be readily adjusted in accordance with the processing capacity.

In this case, it is preferable to stack a plurality of the hollow fiber membrane module units (B) in the vertical direction as shown in FIG. 8 to integrate the units in order to increase the density of the hollow fiber membranes per unit area, although there is a limitation by the depth of the submerging water tank in which the hollow fiber membrane module units (B) are disposed. The hollow fiber membrane module units (B) are stacked in, for example, 2 to 10 levels. When the hollow fiber membrane module units (B) are cleaned by bubbling from an aerator placed below the units, the stacking level is preferably from 4 to 6.

When plural hollow fiber membrane module units (B) are stacked in the vertical direction, if vertical spacing between the sheet-form hollow fiber membranes (1) of adjacent hollow fiber membrane modules is too large, streams of bubbling air tend to converge and form a thick stream, after hitting the membrane surface of the hollow fiber membrane module located below while rising over the membrane surface of the hollow fiber membrane module located above. This leads to a weaker effect of diffusion of the bubbling air, and a uniform effect of cleaning the membrane surface cannot be ensured for hollow fiber membrane modules located at a higher position.

For this reason, vertical spacing between the sheet-form hollow fiber membranes (1) is set to 70 mm or less, preferably 60 mm or less. With this construction, after hitting the membrane surface of the hollow fiber membrane module located at a low position, the bubbling air rises to the membrane surface of the hollow fiber membrane module located above while maintaining diffusion. As a result, cleaning performance is not compromised even when the plurality of hollow fiber membrane modules are stacked in the vertical direction.

The vertical spacing between the sheet-form hollow fiber membranes (1) herein refers to the distance between the bottom end of the anchoring section of the sheet-form hollow fiber membrane (1) of the hollow fiber membrane module located above and the top end of the anchoring section of the sheet-form hollow fiber membrane (1) of the hollow fiber membrane module located just below, and does not mean the distance between the portions that move during vibration movement of air bubbling.

A lower limit of the vertical spacing between the sheet-form hollow fiber membranes (1) is preferably 5 mm or larger, and more preferably 10 mm or larger, since the hollow fiber membranes may be entangled to make it difficult to clean when the distance is too small.

When a plurality of hollow fiber membrane module units (B) are stacked in the vertical direction, it is necessary to collect the filtrate from different caps (6) and discharge it. It is preferable to connect the caps (6) with each other by means of piping members (7) that extend in the vertical direction, for easy connection in compact construction.

For the piping members (7), union joint, flange joint, T-joint, flexible hose, coupling or the like may be used to connect the cap (6) and the piping members (7), or between a plurality of the piping members (7).

The piping members (7) may be made of any material that has sufficient mechanical strength and durability, such as polycarbonate resin, polysulfone resin, acrylic resin, ABS resin, modified PPE (polyphenylene ether), vinyl chloride resin, polyolefin resin (polypropylene, polyethylene, etc.) and metals such as stainless steel, bronze, brass, and cast steel.

The anchoring member (2) used in the hollow fiber membrane module of the present invention may be made of a material that has sufficient bonding strength with the hollow fiber membrane and the housing (10) and satisfies the requirements of the application, including thermosetting resins such as polyurethane resin, epoxy resin, silicone resin or unsaturated polyester resin and thermoplastic resins such as polyurethane resin, ethylene-vinyl acetate copolymer or polyolefin resin. The hollow fiber membrane may be anchored by known methods such as pouring a thermoplastic resin that is melted by heating or applying a thermosetting resin by means of centrifugal force or gravity.

When the housing (10) is used, it may be made of a material that satisfies the requirements of the application such as polyolefin, polycarbonate, modified polyphenylene oxide, ABS and polyvinyl chloride. A material that bonds with the anchoring member (2) with insufficient strength may be used after applying primer treatment.

In the water treatment method according to the present invention, the above-described hollow fiber membrane module or hollow fiber membrane module unit of the present invention is used when the water to be treated is purified with microorganisms attached to the exterior surface of the hollow fiber membrane by supplying water to be treated to the exterior surface of the hollow fiber membrane, and supplying a gas into the hollow portions of the hollow fiber membrane.

The gas to be supplied into the hollow portions of the fiber membrane may be selected in accordance with the kinds of microorganisms to be attached to the exterior surface of the hollow fiber membrane or kinds of components for treatment in the water to be treated, and, for example, air, oxygen, nitrogen, hydrogen, and the like are used.

When hydrogen gas is used as a gas, the amount of hydrogen gas supply easily becomes an excess amount when hydrogen gas is supplied with the porous membrane because hydrogen gas has extremely low solubility to water. Hydrogen gas supplied is almost all discharged to the outside of system without being dissolved into water and being utilized by microorganisms, so that hydrogen usage efficiency becomes extremely low. On the other hand, when the non-porous membrane is used, the supply amount is easily controlled in accordance with the solubility to water or the usage amount of microorganisms and efficient treatment to the amount of gas supply can be carried out. Therefore, the water treatment method of the present invention is suited for, particularly, a case where hydrogen gas is used as a gas.

When a hydrogen gas is used as a gas, it is considered that hydrogen that has passed through the membrane acts as an electron donor, an electron acceptor component in the water to be treated induces an oxidation-reduction reaction in microorganisms, and then the electron acceptor component in the water to be treated is reduced.

As water to be treated, river water, lake water, sewage, and the like are listed, and, as an electron acceptor component, nitrate ion, nitrite ion, perchlorate ion, oxygen, and the like are listed. Among these, nitrate ion, nitrite ion, and perchlorate ion correspond to harmful components. According to the water treatment method of the present invention, nitrate ion and nitrite ion are converted into nitrogen and perchlorate ion is converted into chlorine ion, that is, harmful components are converted into harmless materials.

In the water treatment method according to the present invention, since the exterior surface of the hollow fiber membrane has microorganisms attached and makes contact with water, permeated water and condensed water are accumulated in the hollow portions of the hollow fiber membrane at a gas supply side by permeating water vapor in accordance with the progress of treatment. Water accumulated in the hollow portion of the hollow fiber membrane becomes a resistance factor against a gas supply, and thereby usage efficiency of membranes is decreased. As a result, capacity of a device is decreased.

The following driving method is preferred for maintaining capacity without decreasing performance. That is, using the hollow fiber membrane in which opposite end portions of the hollow fiber membrane are fastened as shown in FIG. 1, when water is accumulated in the hollow portions of the hollow fiber membrane, preferably, pressurized gas is pumped from one end surface of the opening of the hollow fiber membrane and the other end of the opening is left open, and then the water accumulated in the hollow portions of the hollow fiber membrane is discharged. Such an operation enables a gas to always be supplied to microorganisms on the exterior surface of the membranes without resistance and efficient treatment to be carried out.

Discharging accumulated water may be carried out by hand suitably, and preferably, a series of operations is automatically carried out with a timer, sequencer, or the like so as to carry out automatically per every specified period.

The pressurized gas used for discharging water is preferably the same gas which is used for purifying the water to be treated; however, another gas may be used.

Figure 1:
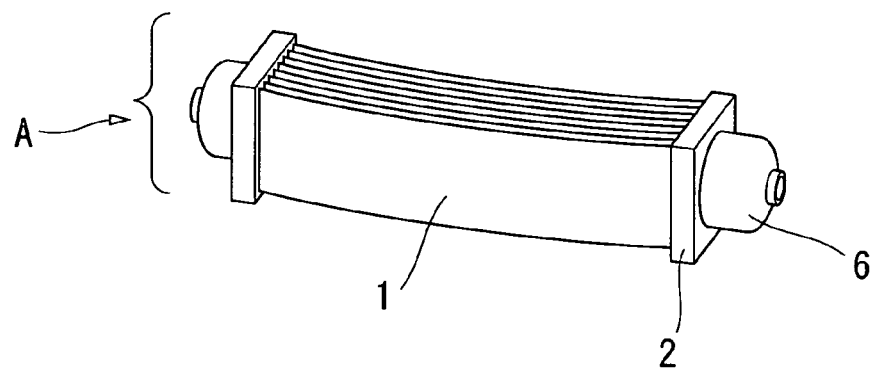
FIG. 1 is a perspective view of an example of a hollow fiber membrane module of the present invention.
Figure 2:
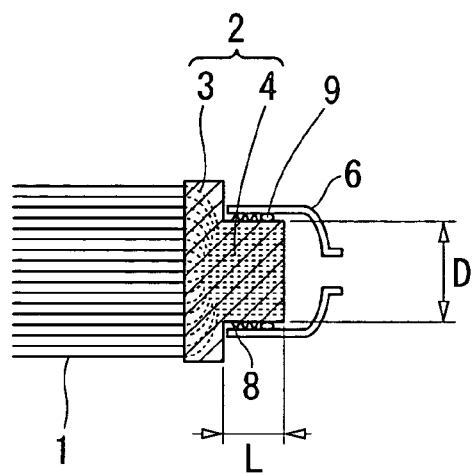
FIG. 2 is a cross-sectional view of an example of a hollow fiber membrane module of the present invention.
Figure 3:
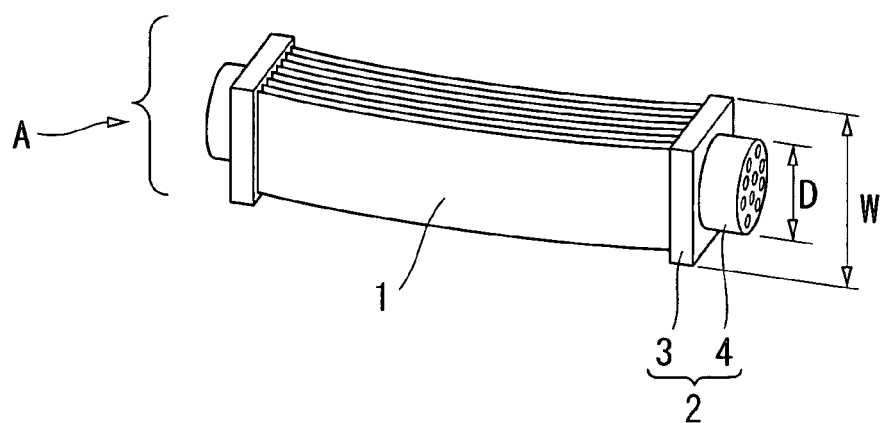
FIG. 3 is a perspective view of an example of a hollow fiber membrane module of the present invention.
Figure 4:
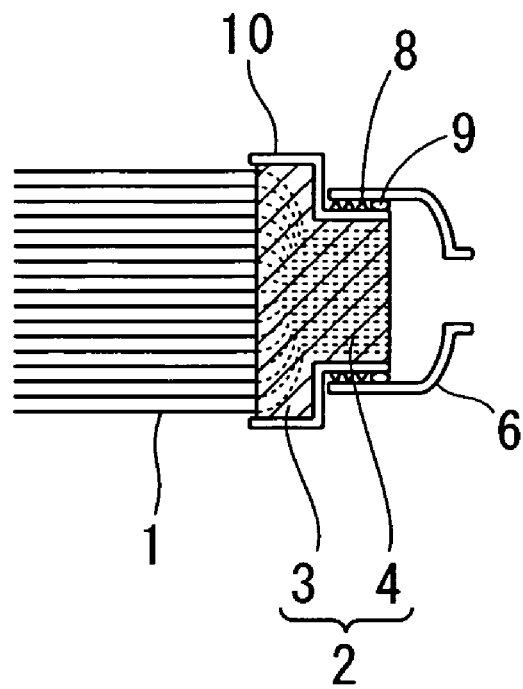
FIG. 4 is a cross-sectional view of an example of a hollow fiber membrane module of the present invention.
Figure 5:
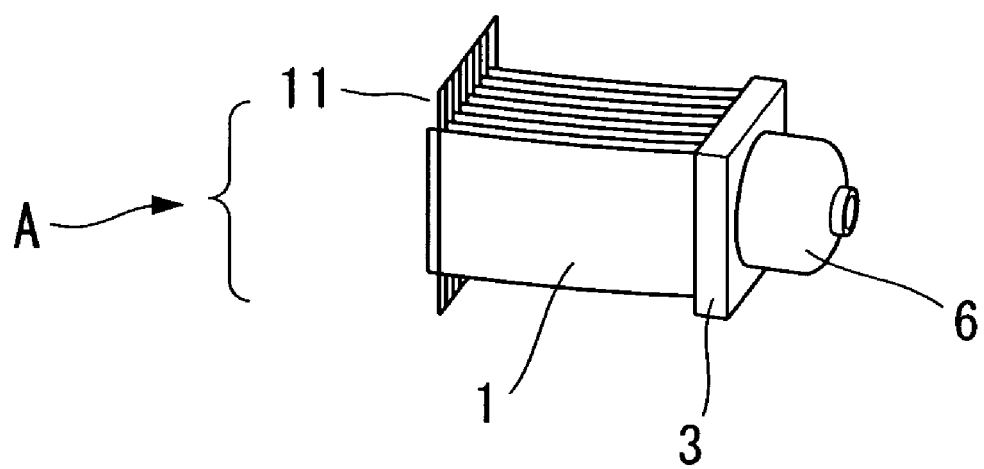
FIG. 5 is a perspective view showing another example of the hollow fiber membrane module of the present invention.
Figure 6:
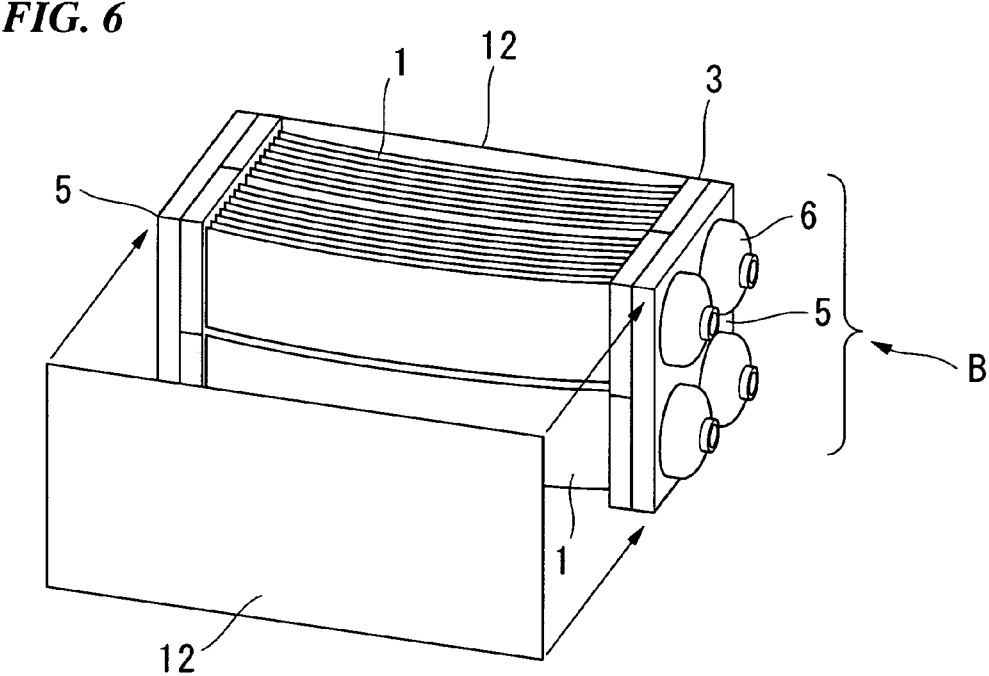
FIG. 6 is a perspective view showing an example of hollow fiber membrane module unit of the present invention.
Figure 7:
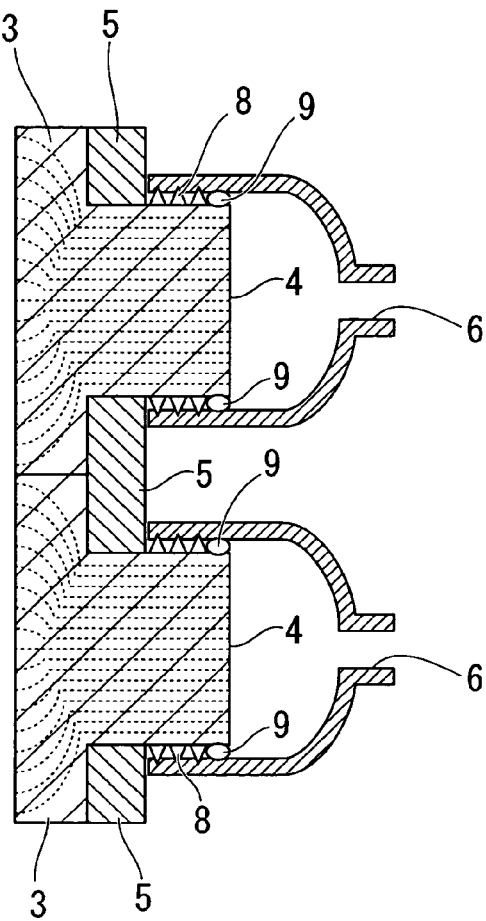
FIG. 7 is a cross-sectional view showing an example of hollow fiber membrane module unit of the present invention.
Figure 8:
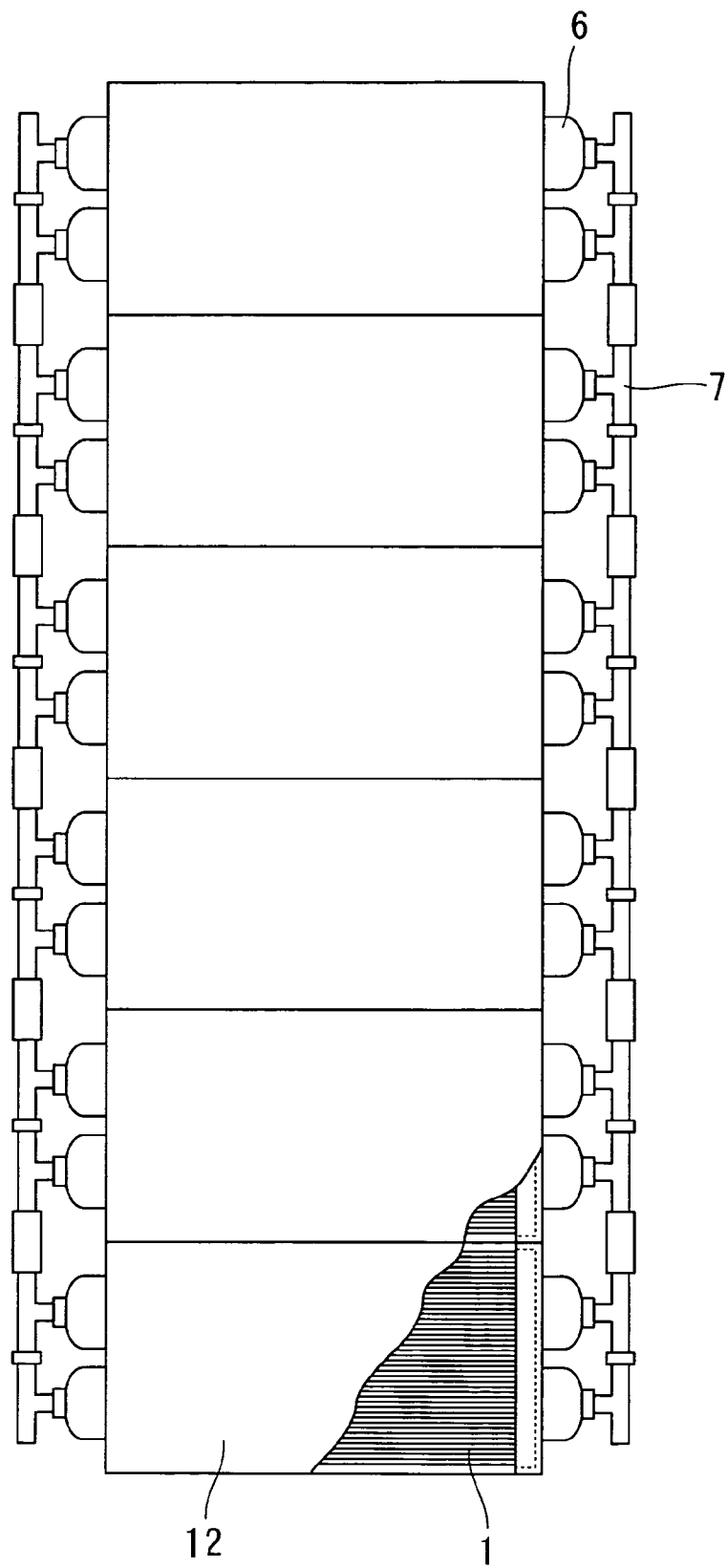
FIG. 8 is a cross-sectional view showing another example of hollow fiber membrane module unit of the present invention.
Figure 9:
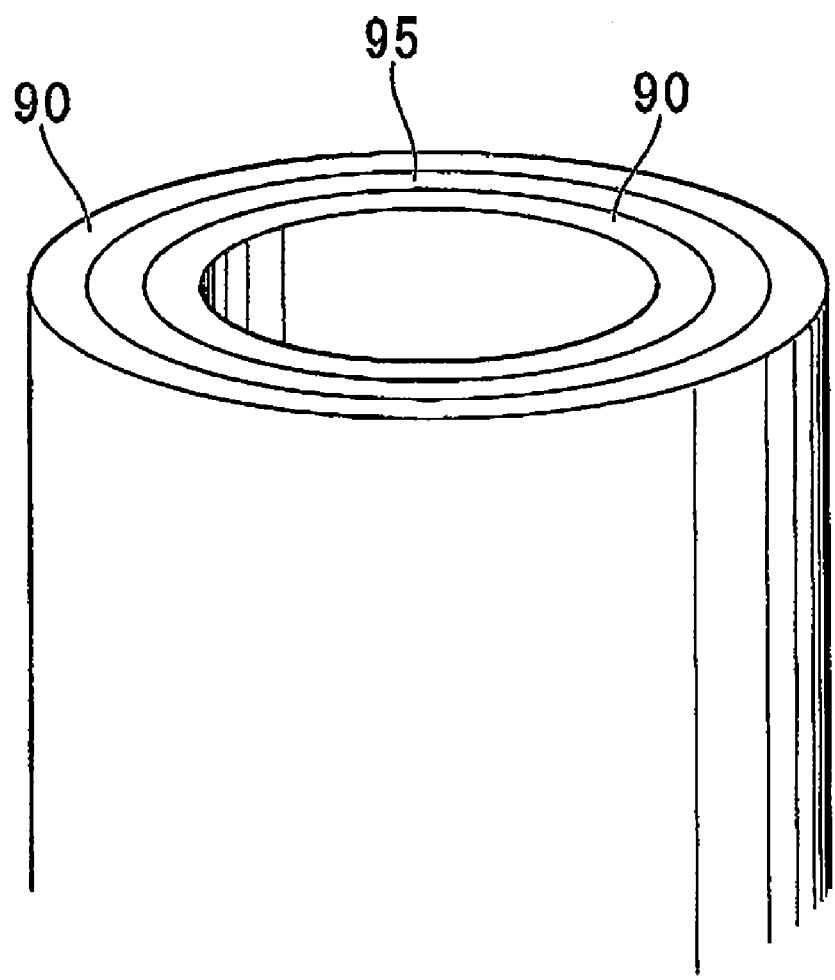
FIG. 9 is a perspective view of an example of a three-layer composite hollow fiber of the present invention.

BRIEF DESCRIPTION OF THE REFERENCE SYMBOLS 1 sheet-form hollow fiber membrane
2 anchoring member
3 rectangular parallelepiped section
4 cylindrical section
5 plate member
6 water collecting cap
7 piping member
8 thread
9 sealing member
10 housing
11 supporting member
12 side plate
90 porous layer
95 non-porous layer

The invention claimed is:

1. A hollow fiber membrane module unit comprising:
a plurality of hollow fiber membrane modules each comprising:
a plurality of sheet-form hollow fiber membranes,
an anchoring member in which at least at least an end of a side of a hollow hollow fiber membrane that opens is fastened so that the plurality of sheet-form hollow fiber membranes are substantially parallel to each other while leaving the end of the hollow fiber membrane open,
the anchoring member having an end face that is substantially rectangular on a side where the hollow fiber membranes are exposed, and
the anchoring member having an end face that is substantially circular on the side where the hollow fiber membranes open,
wherein the anchoring member has a substantially rectangular parallelepiped shape on a side where the hollow fiber membranes are exposed, and has a cylindrical section having a substantially cylindrical shape on a side where the hollow fiber membranes open,
the hollow fiber membrane module satisfies the relationship
$1.0 \leq W/D \leq 2.0$,
wherein W(mm) is a length of the longer side of the end face where the hollow fiber membrane is exposed to the rectangular parallelepiped section and D(mm) is a diameter of the cylindrical section, and
a plate member having a hole through which the cylindrical section passes is provided on a side surface of the hollow fiber membrane perpendicular to the sheet surfaces of sheet-form hollow fiber membranes, and
the hollow fiber membrane module is fastened by the plate member.

2. A hollow fiber membrane module unit according to claim 1, further comprising:
a water collecting cap which engages the cylindrical section, and wherein
the plate member is fastened between the cylindrical section and the water collecting cap.

3. A hollow fiber membrane module unit according to claim 2, comprising:
wherein the cylindrical section and the water collecting cap are engaged by a screw.

4. A hollow fiber membrane module unit, wherein said hollow fiber membrane module unit further comprises a plurality of hollow fiber membrane module units according to claim 2 stacked in a vertical direction, in which sheet surfaces of the sheet-form hollow fiber membranes are disposed in a vertical direction, the water collecting caps that adjoin each other in a vertical direction are connected to each other by a water collecting member that extends in a vertical direction, and a side frame is disposed on a side face parallel to the sheet surfaces of the sheet-form hollow fiber membranes.

5. A hollow fiber membrane module unit according to claim 4, wherein vertical spacing between the sheet-form hollow fiber membranes of adjacent hollow fiber membrane modules is 70 mm or less.

6. A hollow fiber membrane module unit according to claim 1, wherein a said hollow fiber membrane module a relationship $0.2 \leq L/D \leq 1.0$ is satisfied, where D(mm) is a diameter of the cylindrical section and L(mm) a length of the cylindrical section.

* * * * *